Patented Oct. 16, 1928.

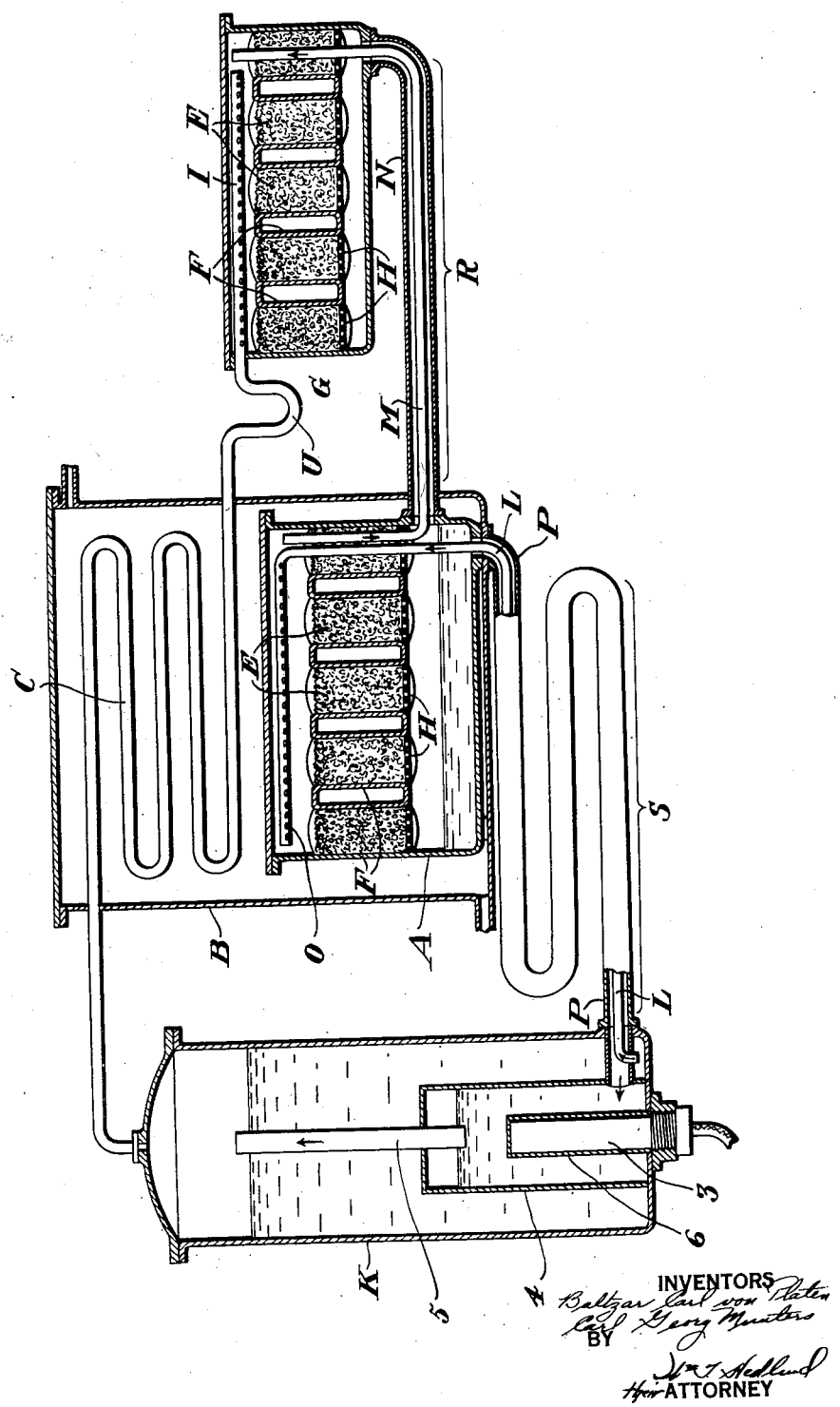

1,687,957

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

Original application filed August 4, 1923, Serial No. 655,768, and in Sweden August 18, 1922. Divided and this application filed March 4, 1927. Serial No. 172,672.

This application is a division of our application Serial No. 655,768, filed August 4, 1923, Patent No. 1,620,843.

The invention relates to absorption refrigerating apparatus in which the absorption liquid is circulated through the generator and the absorber and more particularly to absorption apparatus of the kind in which the generator and the absorber are arranged in open communication with one another. The object of the invention is to effect an automatic circulation of absorption liquid without using any kind of mechanical device.

According to the invention, the absorption liquid is circulated by a novel and efficient thermo-siphon arrangement including an auxiliary generator and a conduit extending within the same and arranged, together with the auxiliary generator, to form a vapor space in the upper part of the auxiliary generator.

The invention will be more fully described with reference to the accompanying diagrammatic drawing illustrating one embodiment of the invention.

The refrigerating apparatus shown on the accompanying drawing comprises a main generator K, an evaporator G and an absorber A. The generator K contains the cooling agent, for instance ammonia, dissolved in water. The evaporator G and the absorber A contain a gas or gas mixture, which is inert with respect to the cooling agent and which may be hydrogen. The evaporator and the absorber preferably contain a porous or fibrous material E, for instance metal wool or cuttings, disposed in a number of tubular cells F, which communicate with one another at the top and at the bottom, and which are provided with perforated bottoms H. Said porous or fibrous material serves as a means for distributing the liquid entering the evaporator and the absorber respectively over a large surface while at the same time facilitating the transfer of heat. The gas space of the generator is connected with the upper part of the evaporator G by means of a condenser coil C, placed together with the absorber in a cooling water tank B. The end of the pipe entering the evaporator forms a perforated distributor I. The evaporator G and the absorber A are arranged in unobstructed communication with one another by means of pipes M and N connecting the receptacles at the top and at the bottom respectively and forming together a heat exchanger R, the pipe M being located inside the pipe N. The evaporator should generally be located at a higher level than the absorber in order to prevent the lower pipe connection between the evaporator and the absorber from being closed up by liquid.

Within main generator K is an auxiliary generator 4. The auxiliary generator comprises a cylindrical shell closed at its upper end except for an opening through which a riser pipe 5 passes and closed at its bottom from the generator proper. The space around receptacle 4 forms the main generator. Riser pipe 5 extends downwardly within receptacle 4 and serves to connect receptacle 4 with the upper part of the generator proper. The auxiliary generator is heated by means of an electric heater 3 which sets into a cylindrical member 6 suitably connected to the bottom of the generator. The arrangement is such that the electrical heater 3 is surrounded on all sides by the liquid contents of the auxiliary generator 4. Electrical heater 3 also serves to heat the main generator, heat being transmitted for this purpose through the shell of receptacle 4.

A conduit L connects the bottom part of main generator K with the upper part of the absorber, the absorber end terminating in a perforated distributor O. A pipe P opens at one end in the auxiliary generator at the bottom thereof and at the other end in the lower part of the absorber. Pipe L is located inside pipe P so as to form a heat exchanger S. Members 4, 5 and P serve as a thermo-siphon to move the absorption liquid from the lower part of the absorber to the higher level in the main generator.

The apparatus operates as follows:

On heating the generator the ammonia is expelled from the water and caused to flow from the generator through the condenser coil C and a liquid seal U to the evaporator G. The ammonia is condensed in the condenser so as to reach the evaporator in liquid condition. The ammonia, consequently, flows into and spreads over the porous or fibrous material E, at the same time evaporating and diffusing into the hydrogen in the evaporator while absorbing heat from the surroundings of the evaporator. The mixture of hydrogen and ammonia which is heavier than the hydrogen itself, will flow through the pipe N into the cooled absorber A and, in rising through the fibrous material E in the cells F, it will be brought in contact with the liquid flowing down through the absorber, the ammonia but not the hydrogen being then dissolved or absorbed in the liquid. The ammonia is thus separated from the gas mixture, whereas the hydrogen rises through the absorber and returns to the evaporator G through the pipe M. In entering the evaporator the hydrogen again mixes with the ammonia vapor. The automatic circulation of the inert gas is thus maintained substantially on account of the difference of the specific weights of the inert gas and the vapor of the cooling agent but also owing to the cooling of the gases in the evaporator and the heat of the gases in the absorber, the specific weight of the gases being thereby increased and decreased respectively.

All parts of the apparatus being in open and unobstructed communication with one another, the same or substantially the same absolute pressure will prevail throughout the whole apparatus.

Circulation of the absorption liquid between the generator and absorber is effected by gas developed in the receptacle 4. Due to the application of heat, the liquid column contained in members 4 and 5 is lightened and being lighter per unit volume than the liquid within pipe P and the bottom of the absorber, there is a flow of liquid upwardly to the higher level of liquid in the generator. Liquid flows from the generator to the absorber through pipe L due to gravity. The gas developed in the receptacle 4 operates to periodically force a liquid column upward through pipe 5. As gas is developed in receptacle 4, the liquid level is forced below the opening of pipe 5 and gas escapes through pipe 5, thereby causing the liquid in the pipe to be discharged into the generator.

While we have described one form of our invention, it is to be understood that we are not limited to the form disclosed or described.

Having thus described our invention, what we claim is:

1. Refrigerating apparatus of the absorption type comprising a main generator, an absorber, an auxiliary generator, a conduit extending from within said auxiliary generator upwardly to said main generator and opening within said auxiliary generator below the top thereof, means to heat the main and auxiliary generators, the parts being so arranged that a gas space is formed in the upper part of said auxiliary generator upon application of heat thereto, a conduit connecting the lower part of the absorber with the auxiliary generator, and a conduit connecting the lower part of the main generator with the upper part of the absorber.

2. Refrigerating apparatus of the absorption type comprising a main generator, an auxiliary generator, an absorber, said main generator and auxiliary generator being formed in the same casing, a conduit extending from within said auxiliary generator upwardly to said main generator and opening within said auxiliary generator below the top thereof, the parts being so arranged that a gas space is formed in the upper part of said auxiliary generator upon application of heat thereto, a conduit connecting the lower part of the absorber with the auxiliary generator, a conduit connecting the lower part of the generator with the upper part of the absorber, and a common source of heat for said main generator and said auxiliary generator.

3. Refrigerating apparatus of the absorption type comprising a main generator, a condenser, an evaporator, an absorber, an auxiliary generator, these parts being interconnected so that substantially the same pressure exists throughout and containing a cooling agent, an absorption liquid, and an auxiliary agent in the presence of which the cooling agent evaporates, said apparatus including a conduit extending from within said auxiliary generator upwardly to said main generator and opening within said auxiliary generator below the top thereof, the parts being so arranged that a gas space is formed in the upper part of said auxiliary generator upon application of heat thereto, a conduit connecting the lower part of the absorber with the auxiliary generator, and a conduit connecting the lower part of the main generator with the upper part of the absorber, the main generator and the auxiliary generator being formed as a unit structure capable of being heated by one source of heat.

4. Apparatus according to claim 2 wherein the source of heat is an electrical heater.

5. Apparatus according to claim 3 wherein the auxiliary generator is situated within the main generator.

6. Refrigerating apparatus of the absorption type comprising a main generator containing a cooling agent in solution, a condenser receiving vapor from said generator and condensing the same, an evaporator supplied with condensate from the condenser and containing an auxiliary agent in the presence of which the condensate evaporates, an absorber, circulation means between the evaporator and absorber arranged to circulate the auxiliary agent between the evaporator and absorber, an auxiliary generator, a conduit extending from within said auxiliary generator upwardly to said main generator and opening within said auxiliary generator below the top thereof, the parts being so arranged that a gas space is formed in the upper part of said auxiliary generator upon application of heat thereto, a conduit for conducting liquid from the absorber to the auxiliary generator, a conduit connecting the lower part of the main generator with the upper part of the absorber, and means for heating the main generator and the auxiliary generator.

7. Refrigerating apparatus of the absorption type comprising a main generator containing a cooling agent in solution, an absorber, a condenser, an evaporator, an auxiliary generator, a conduit extending from within said auxiliary generator upwardly to said main generator and opening within said auxiliary generator below the top thereof, means to heat the main generator and the auxiliary generator, the parts being so arranged that a gas space is formed in the upper part of said auxiliary generator upon application of heat thereto, a conduit connecting the lower part of the absorber with the auxiliary generator, the arrangement being such that the normal liquid level in the lower part of the absorber is above the normal liquid level in the auxiliary generator, a conduit connecting the lower part of the main generator with the upper part of the absorber, a conduit for conducting vapor from the generator to the condenser, a conduit for conducting condensate from the condenser to the evaporator, and means for circulating an auxiliary agent in the presence of which the cooling agent evaporates through the evaporator and absorber dependent on force generated wholly within the system of apparatus.

In testimony whereof we hereunto affix our signatures.

BALTZAR CARL von PLATEN.
CARL GEORG MUNTERS.